US011926407B2

United States Patent
Roberts (10) Patent No.: US 11,926,407 B2
(45) Date of Patent: Mar. 12, 2024

(54) JAM TOLERANT ROTARY ACTUATOR

(71) Applicant: Eaton Intelligent Power Limited, Dublin (IE)

(72) Inventor: Daniel Henry Roberts, Monrovia, CA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 17/737,729

(22) Filed: May 5, 2022

(65) Prior Publication Data
US 2022/0355915 A1 Nov. 10, 2022

Related U.S. Application Data

(60) Provisional application No. 63/185,452, filed on May 7, 2021.

(51) Int. Cl.
*B64C 13/34* (2006.01)
*B64C 13/28* (2006.01)
*F16H 57/02* (2012.01)

(52) U.S. Cl.
CPC ............ *B64C 13/341* (2018.01); *B64C 13/34* (2013.01); *F16H 57/02* (2013.01)

(58) Field of Classification Search
CPC ........ B64C 13/341; B64C 13/34; F16H 57/02
See application file for complete search history.

(56) References Cited

U.S. PATENT DOCUMENTS

| | | | | |
|---|---|---|---|---|
| 4,353,604 A | * | 10/1982 | Dulberger | F16C 27/045 415/113 |
| 4,575,027 A | * | 3/1986 | Cronin | B64C 13/505 91/509 |
| 4,909,364 A | | 3/1990 | Grimm | |
| 7,452,135 B1 | * | 11/2008 | Holsaple | F16C 27/04 384/535 |
| 8,960,031 B2 | * | 2/2015 | Keech | F16H 25/205 244/99.3 |
| 10,816,070 B2 | | 10/2020 | Lagger et al. | |
| 2007/0012530 A1 | * | 1/2007 | Garcia | F16C 35/077 188/268 |
| 2017/0045129 A1 | | 2/2017 | Balsiger | |

FOREIGN PATENT DOCUMENTS

KR 20080036387 A * 10/2006 ............. F16H 57/02

* cited by examiner

*Primary Examiner* — Thomas C Diaz
(74) *Attorney, Agent, or Firm* — Merchant & Gould P.C.

(57) ABSTRACT

Various flight control components can be operated through gearbox driven rotary actuators. In the event of a jam occurring the gearbox, the gearbox can be decoupled from a surrounding support housing to enable free-trailing or limited motion relative to the support housing. The motion may or may not be damped. Decoupling the gearbox enables the flight control component to move to a neutral or non-interfering position even when user control over the component has been lost.

20 Claims, 5 Drawing Sheets

JAM TOLERANT ROTARY ACTUATOR

CROSS-REFERENCE TO RELATED APPLICATIONS

This application is a nonprovisional of and claims the benefit of provisional application Ser. No. 63/185,452, filed May 7, 2021, which application is incorporated herein by reference in their entirety.

BACKGROUND

Recent trends in aeronautics have been towards lighter, smaller aircraft. To achieve these goals, many internal systems—including flight control—are starting to move away from hydraulic actuation towards electric actuation. However, an electric motor tends to supply less torque than an equivalently sized hydraulic motor. To compensate for this reduced torque, gearboxes are introduced between the electric motor and the actuator (e.g., rotary actuator). Gearbox driven rotary actuators can be used in flight control actuation to control the rudders, elevator, ailerons, spoilers, pylon, speed brakes, and other such components. However, gearbox driven rotary actuators are more likely to jam due to breaking gear teeth, seized bearings, or other factors. In flight control, such a jam may induce problems controlling the aircraft leading to a hazardous flight condition.

Improvements are desired.

SUMMARY

Some aspects of the disclosure are directed to releasing a jammed rotary actuator to enable free, damped, and/or regulated motion relative to a support structure in response to the application of an external load. Accordingly, the rotary actuator is not stuck in a position that interferes with the safe flight and landing of the aircraft even when jammed. For example, the rotary actuator may be enabled to move to a neutral position. In certain implementations, the outer housing of the gearbox of the rotary actuator is decoupled from the support structure so that the jammed rotary actuator—and hence a component (e.g., flight control component) connected thereto—can move relative to the support structure.

In certain implementations, a flight control actuation arrangement (e.g., an actuation arrangement for a flight control component using the rotary actuator) includes a latch arrangement to selectively couple and decouple the gearbox outer housing to the support housing; at least one jam sensor to determine whether or not the rotary actuator is jammed; and a release actuator to operate the latch arrangement in response to data obtained from the jam sensor. The latch arrangement releasably maintains the gearbox at a fixed rotational position relative to the support housing when in a locking state. When transitioned to an unlocking state, the latch arrangement decouples the gearbox outer housing from the support housing so that the gearbox outer housing (and the jammed output shaft) can rotate relative to the support housing in response to external loads (e.g., air current, air pressure, etc.) applied to the flight control component operated by the rotary actuator.

In certain examples, the latch arrangement includes a solenoid that extends and retracts to couple and decouple the rotary actuator (e.g., via the gearbox outer housing) to the support structure. Alternatively, other motor or manually operated latches are possible.

In some implementations, actuating the latch arrangement enables the gearbox outer housing to freely move (e.g., rotate) relative to the support housing. In other implementations, however, a damper (e.g., a friction damper, a fluid damper, etc.) is disposed between the gearbox outer housing and the support structure. The damper limits the velocity of the motion of the gearbox outer housing relative to the support housing to avoid fluttering or other such problems.

In other implementations, an anti-float device (e.g., a clutch, a ratchet, etc.) may be disposed between the gearbox outer housing and the support housing in addition to or in place of a damper. The anti-float device enables rotation of the gearbox outer housing relative to the support housing in a first direction and inhibits such movement in an opposite second direction. Accordingly, the anti-float device may enable movement of the rotary actuator towards a neutral position, but not further away from the neutral position.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
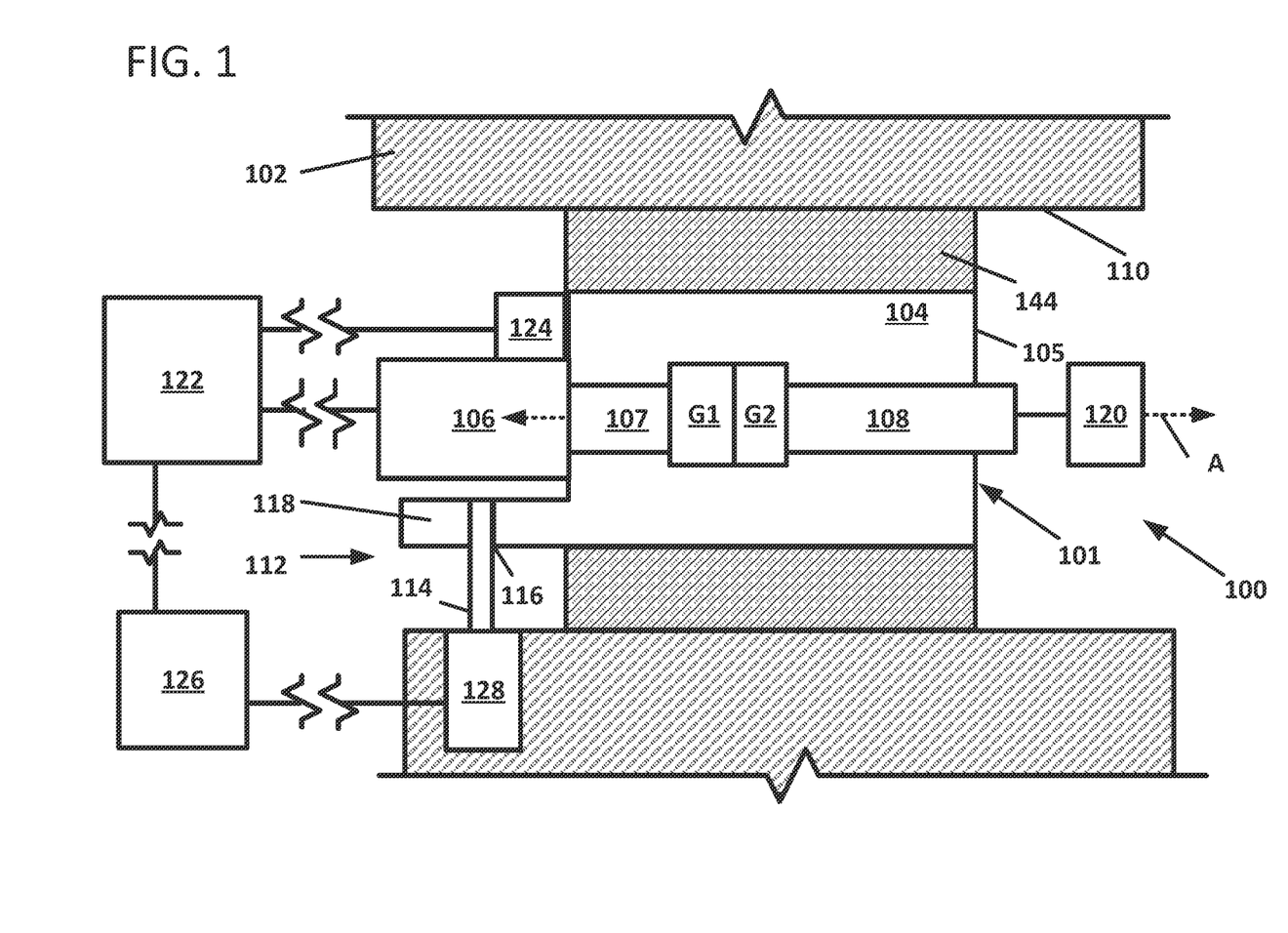
FIG. 1 is a schematic diagram of an example flight control actuation arrangement including a latch arrangement configured to selectively couple and decouple an outer housing of a gearbox of a rotary actuator from a support housing, the latch arrangement being shown in a locking state coupling the gearbox outer housing to the support housing.

Referring to FIG. 1, the present disclosure is directed to a flight control actuation arrangement 100 including a rotary actuator 101 configured to mount to a support housing 102. The rotary actuator 101 includes a gearbox 104 and an electric motor 106 or other power source mounted to the support housing 102. A drive shaft 107 of the electric motor 106 is operationally coupled to an output shaft 108 of the gearbox 104 via two or more gears G1, G2. The output shaft 108 of the gearbox 104 is operationally coupled to a flight control component 120 so that the gearbox 104 transfers power (e.g., torque) from the motor 106 to the flight control component 120 via rotation of the shafts 107, 108 about an axis A. In certain examples, the gears G1, G2 of the gearbox 104 can provide a change of gear ratio between the motor drive shaft 107 and the gearbox output shaft 108.

The output shaft 108 of the gearbox 104 is coupled to one or more flight control components 120 to actuate (i.e., move) the flight control components 120. In various examples, the flight control component 120 may include the rudder, elevator, ailerons, spoilers, speed brakes, or other such component. Each flight control component 120 typically moves (e.g., pivots) between a neutral position and at least one deflected position.

The gearbox 104 includes an outer housing 105 within which the gears G1, G2 are disposed. A portion of the motor drive shaft 107 and a portion of the output shaft 108 also extend within the outer housing 105 along the axis A. Lubricant may be disposed within the outer housing 105 to facilitate relative movement of the gears G1, G2. The outer housing 105 of the gearbox 104 can be mounted to a support housing 102 (e.g., within a cavity 110 defined by the support housing 102). In certain implementations, the cavity 110 and the gearbox outer housing 105 both have a generally cylindrical transverse cross-sectional profile so that the gearbox outer housing 105 has clearance to rotate within the cavity 110. In other implementations, the outer transverse cross-sectional profile of the gearbox outer housing 105 is otherwise shaped relative to the transverse cross-sectional profile of the cavity 110 to enable at least limited movement of the gearbox outer housing 105 within a range of motion relative to the support housing 102. In certain implementations, the gearbox outer housing 105 is coupled to the support housing 102 via one or more intermediate components (e.g., a damper 144, an anti-float device 148, etc.) as will be discussed in more detail herein.

Normally, the motor 106 provides a driving force to the output shaft 107 in response to a user's command. For example, a signal can be sent from a main system processor 122 to the motor 106 in response to user input or predetermined instructions. The motor drive shaft 107 entrains the gearbox output shaft 108 into rotational movement along the axis A. Rotational movement of the gearbox output shaft 108 causes and guides movement of the flight control component 120 between the neutral and deflected position(s) even against the bias of external forces (e.g., air pressure). However, when the gears G1, G2 break or the gearbox 104 otherwise become jammed, the motor 106 cannot provide a driving force to the gearbox output shaft 108 and the main system processor 122 loses control over the flight control component 120. Such loss of control could be hazardous if the flight control component 120 were permanently stuck in a deflected position.

To mitigate this hazard, the flight control actuation arrangement 100 of the present disclosure is configured to be transitioned between a non-jammed mode and a jammed mode. When operating in the non-jammed mode, the gearbox outer housing 105 is fixed to the support housing 102 and gearbox output shaft 108 is coupled to the motor drive shaft 107 so that the motor 106 can drive the flight control component 120 in accordance with normal operating procedure. When a jam occurs (e.g., between the gears G1, G2 within the gearbox 104), the flight control actuation arrangement 100 is transitioned to the jammed mode. When in the jammed mode, the gearbox outer housing 105 is decoupled from the support housing 102 so that the gearbox 104 can rotate along the axis A relative to the support housing 102. Accordingly, even if the output shaft 108 is stuck in one position relative to the gearbox outer housing 105, the output shaft 108 can still move relative to the support housing 102. Accordingly, external forces (e.g., air current, air pressure, etc.) applied to the flight control component 120 may shift the flight control component 120 (e.g., towards a neutral position).

In certain implementations, the flight control actuation arrangement 100 includes a latch arrangement 112 configured to selectively couple and decouple at least the gearbox 104 of the rotary actuator 101 to the support housing 102. The latch arrangement 112 is configured to transition between a locking state and an unlocking state. When the flight control actuation arrangement 100 is operating in the non-jammed mode, the latch arrangement 112 is configured in the locking state. When the flight control actuation arrangement 100 enters the jammed mode, then the latch arrangement 112 is transitioned to the unlocking state. The latch arrangement 112 maintains the gearbox outer housing 105 at a fixed position relative to the support housing 102 when in the locking state and enables the gearbox outer housing 105 to rotate relative to the support housing 102 when in the unlocking state.

In some implementations, the electric motor 106 is de-energized (e.g., by the main system processor 122) so that a drive shaft 107 from the motor 106 is freely rotatable relative to an outer housing of the motor 106. Accordingly, the gearbox 104 can rotate relative to the motor 106 without needing to decouple the gearbox output shaft 108 from the drive shaft 107. Therefore, the outer housing of the motor 106 can be fixedly mounted to the support housing 102, which simplifies management of the power cord. In other implementations, the electric motor 106 is mounted to the gearbox 104 instead of to the support housing 102. Accordingly, the electric motor 106 rotates in unison with the gearbox 104 relative to the support housing 102 when the latch arrangement 112 is disposed in the unlocking position.

Figure 2:
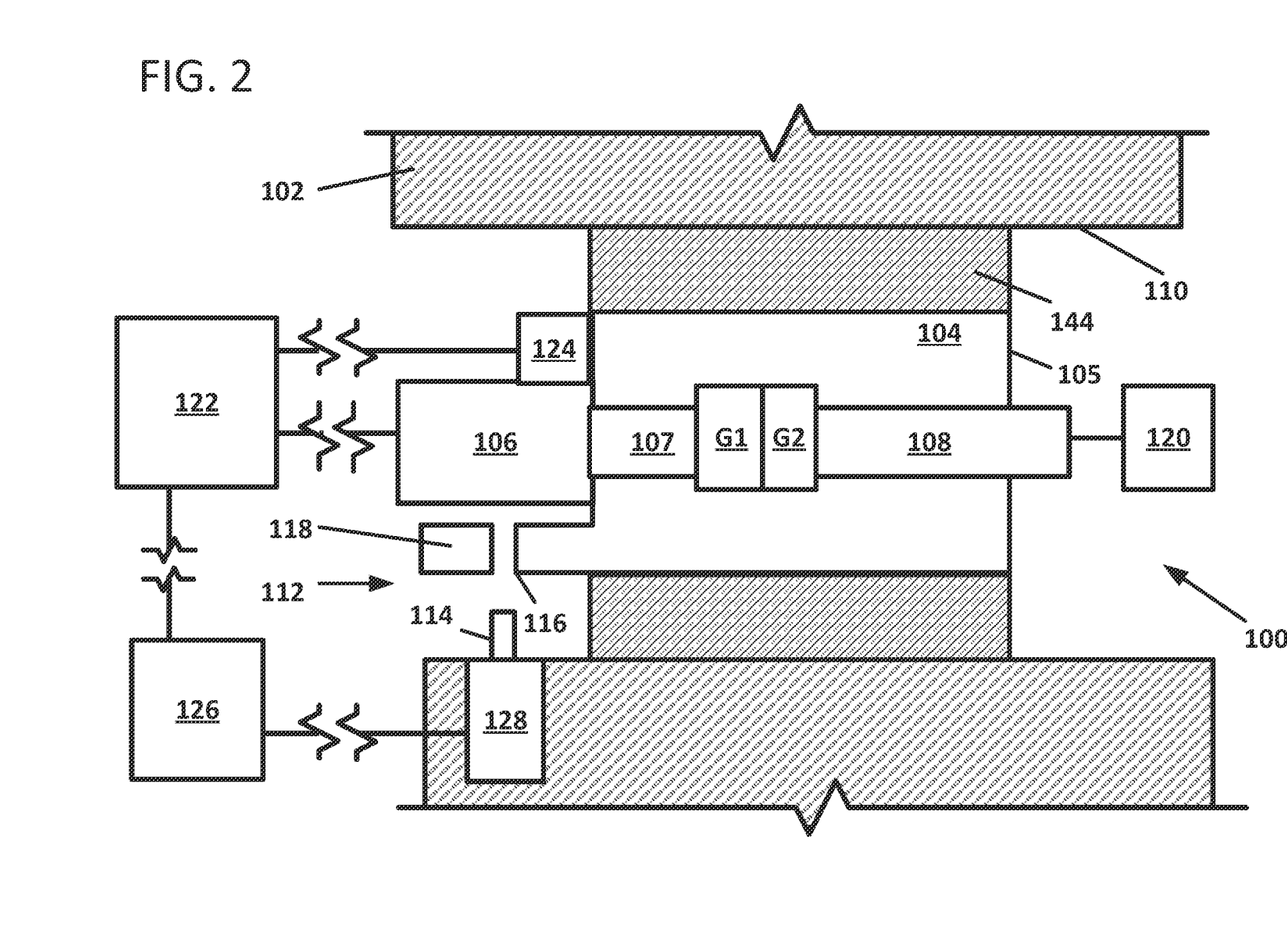
FIG. 2 shows the latch arrangement of FIG. 1 in an unlocking state so that the gearbox outer housing is rotatable relative to the support housing.

In certain implementations, the latch arrangement 112 includes a rod or other latch member 114 that can be moved in and out of engagement with a catch surface 116 (FIG. 2). The latch member 114 is mounted to one of the support housing 102 and the gearbox outer housing 105. The catch surface 116 is defined by the other of the support housing 102 and the gearbox outer housing 105. In the example depicted in FIGS. 1 and 2, the latch member 114 is attached to a solenoid 128 mounted to the support housing 102 and the catch surface 116 is defined by an extension 118 from the gearbox outer housing 105. The solenoid can extend and retract to slide the rod 114 in and out of engagement with the catch surface 116. In other examples, the catch surface 116 can be defined by a main body of the outer housing 105 of the gearbox 104. In still other examples, the latch member 114 can be mounted to the gearbox 104 and the catch surface 116 can be defined by the support housing 102. In other implementations, the latch member 114 is an electronic latch that is otherwise movable.

In certain implementations, a release controller 126 manages operation of the latch arrangement 112. The release controller 126 is operationally coupled to the latch member 114. For example, the release controller 126 may be electrically coupled to the solenoid 128 to manage extension and retraction of the latch member 114. In some examples, the release controller 126 is controlled, directly or indirectly, by the main system processor 122. For example, the release controller 126 may extend or retract the solenoid 128 in response to a signal from the main system processor 122 that a jam has occurred. In other examples, the release controller 126 makes the determination that a jam has occurred based on data from one or more sensors 124.

Figure 3:
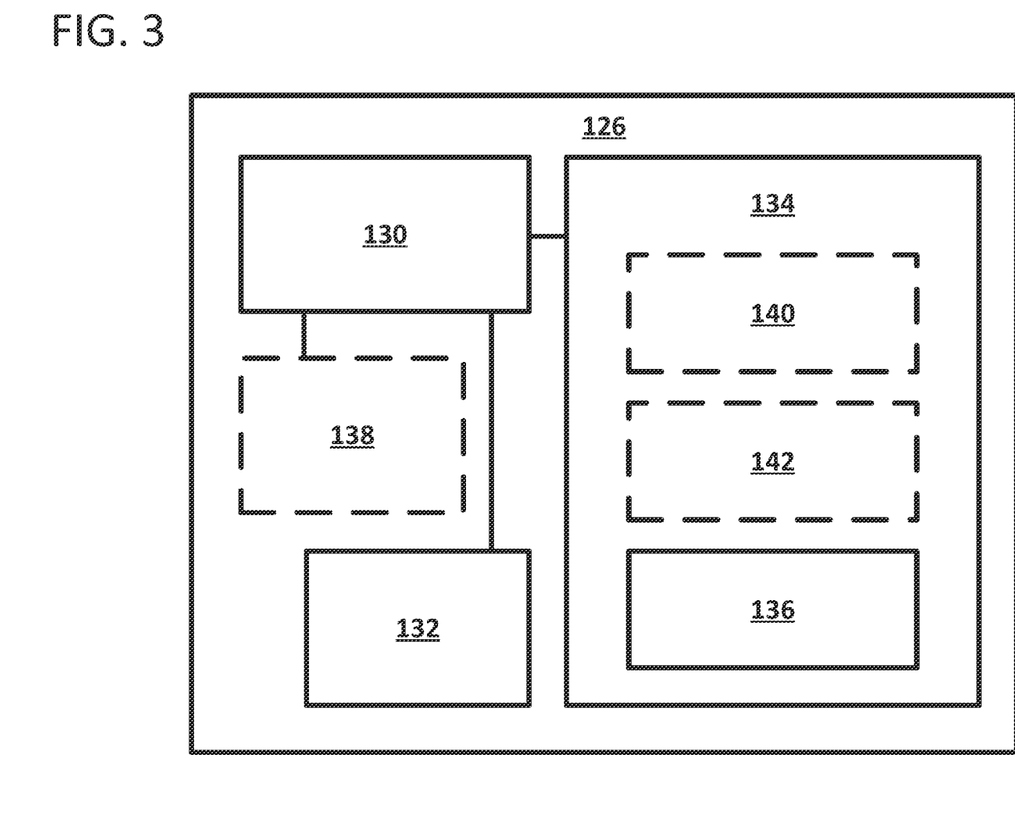
FIG. 3 is a schematic diagram of a processing system for controlling the latch arrangement of FIGS. 1 and 2.

FIG. 3 illustrates one example implementation of a release controller 126 including a processor 130, a latch controller interface 132, and memory 134. Instructions 136 for operating the latch member 114 (e.g., for processing and sending instructions to the solenoid 128) are stored in the memory 134. The processor 130 reads the instructions 136 and actuates the latch member 114 (e.g., through the solenoid 128) via the latch controller interface 132.

In some implementations, the release controller 126 also includes a sensor interface 138 that is operationally coupled to one or more jam sensors 124. In such examples, the memory 134 stores sensing instructions 140 for processing the signals obtained from the jam sensor(s) 124 and determination instructions 142 for determining whether a jam has occurred based on the processed signals. In other implementations, the release controller 126 receives instructions on when to actuate the latch member 114 from the main system processor 122, which receives and processes the signals from the jam sensor(s) 124 (e.g., see FIG. 1).

In some examples, the jam sensors 124 have a primary function of determining whether the gearbox 104 has jammed. In other examples, the jam sensors 124 have other primary functions and have a secondary function of determining whether the gearbox 104 has jammed. In some examples, data is obtained from a single jam sensor 124. In other examples, data is obtained from multiple sensors 124 at various positions along the rotary actuator 101. In certain examples, the multiple sensors 124 may be configured to sense different types of operating conditions. In various examples, the one or more jam sensors 124 include a speed sensor for determining rotational velocity of the gearbox output shaft 108 and/or the motor drive shaft 107; a position sensor for determining the position of the gearbox output shaft 108, the motor drive shaft 107, the flight control component 120, or any of the gears G1, G2 within the gearbox 104; a fluid pressure sensor to sense a build-up of fluid (e.g., coolant, brake fluid, lubricant, etc.) within the gearbox 104 or motor 106; and/or a temperature sensor to sense a build-up in heat due to friction caused by the jam.

Data from the jam sensor 124 may be compared against expected data based on the operating instructions provided to the flight control actuation arrangement 100 from the main system processor 122 or an intermediate system processor. For example, if instructions are sent to the rudder 120 to move from a deflected position to a neutral position and if a speed sensor determines that the gearbox output shaft 108 or motor drive shaft 106 hasn't moved to the extent expected, then a processor (e.g., the processor 130 of the release controller 126, the main system processor 122, or an intermediate processor) may determine that a jam has occurred.

Referring back to FIGS. 1 and 2, in certain implementations, a damper 144 is disposed between (e.g., disposed radially between) the outer housing 105 of the gearbox 104 and the support housing 102. The damper 144 limits the velocity at which the gearbox outer housing 105 may rotate relative to the support housing 102 when the latch arrangement 112 is in the unlocking state. Limiting the velocity of the gearbox outer housing 105 relative to the support housing 102 avoids oscillation of the flight control component 120, which could interfere with a safe flight and/or landing. Such oscillation also could lead to damage to the flight control component 12.

Figure 4:
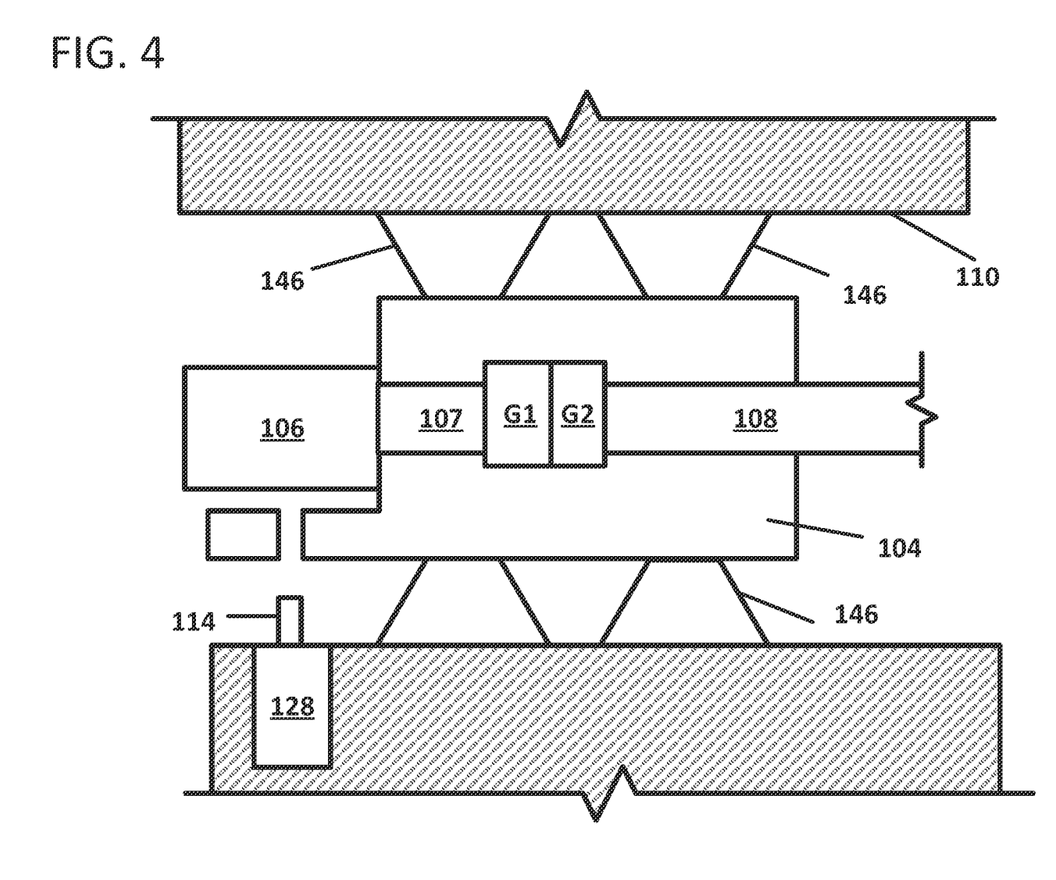
FIG. 4 illustrates an example friction damper suitable for use between the gearbox outer housing and the support housing.

In some examples, the damper 144 includes a friction damper. For example, a precompressed ring of friction material, one or more wedges 146 (see FIG. 4), friction plates, or other such friction inducing components may be disposed between the gearbox 104 and the support housing 102. In other examples, the damper 144 includes a fluid damper. A fluid damper includes a rotor connected to the gearbox outer housing 105 and a stator connected to the support housing 102 with a viscous fluid between them acting to damp the motion of the gearbox housing 105 relative to the support housing 102. Other types of dampers are possible.

In some implementations, transitioning the latch arrangement 112 to the unlocking state results in free-trailing (albeit possibly damped) movement of the gearbox output shaft 108 and hence the flight control component 120 relative to the support housing 102 via rotation of the gearbox outer housing 105 relative to the support housing 102. In other implementations, however, free-trailing movement of the flight control component 120 may interfere with the safety of the flight and/or landing. For example, at least spoilers and speed brake control surfaces should not be allowed to move freely. Accordingly, an anti-float device 148 may be fitted between the gearbox outer housing 105 and/or the support housing 102.

Figure 5:
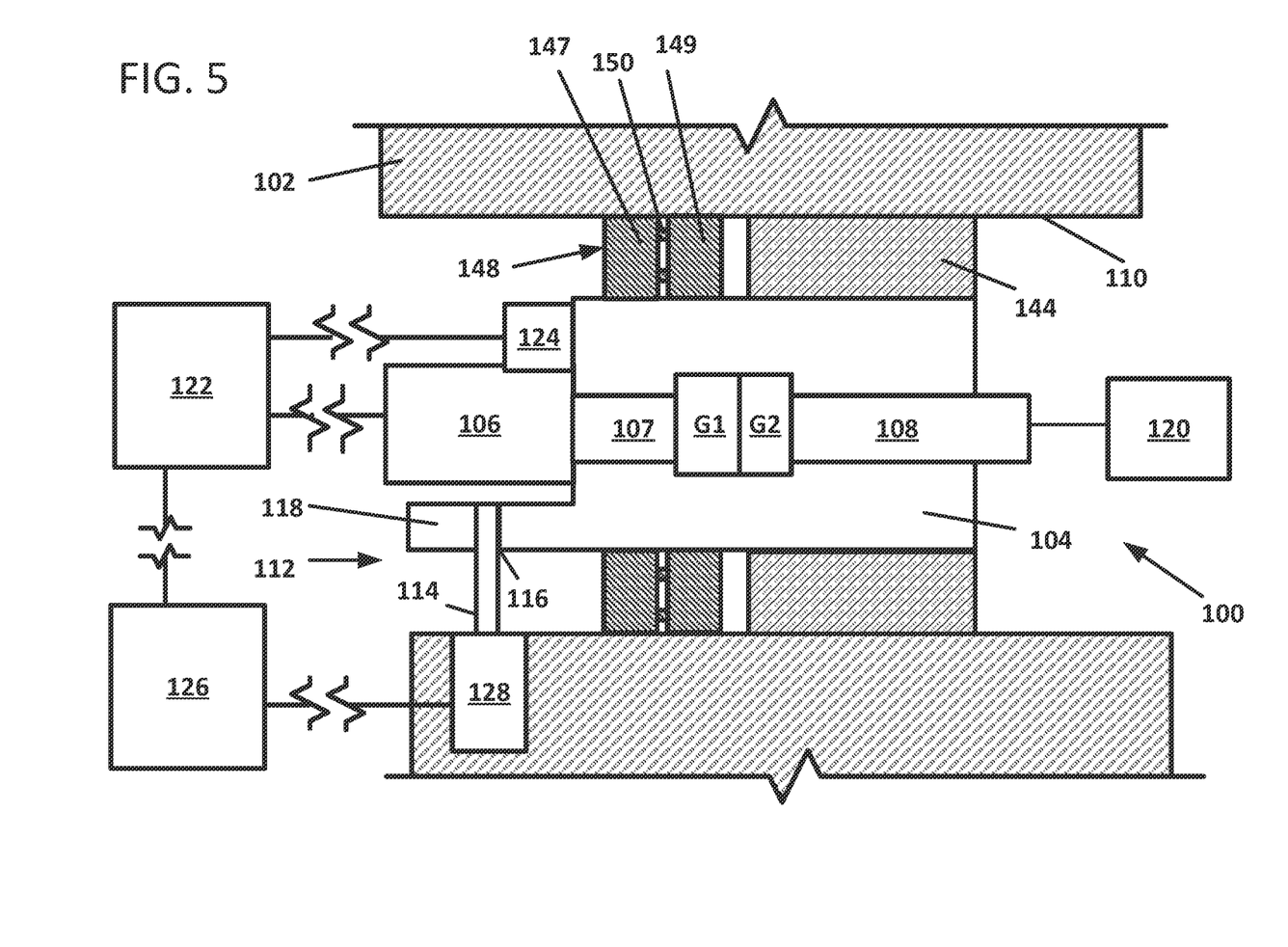
FIG. 5 illustrates an anti-float device disposed between the gearbox outer housing and the support housing to limit relative motion therebetween to a single direction.

Referring to FIG. 5, the anti-float device 148 may limit motion of the gearbox outer housing 105 and, hence, the jammed gearbox output shaft 108 and flight control component 120 to a single direction. For example, the anti-float device 148 may be configured to allow movement between the gearbox outer housing 105 and the support housing 102 only towards a neutral position (e.g., away from a deflected position) of the flight control component 120. In some examples, the anti-float device 148 includes a one-way clutch such as a sprag clutch. In the example shown, the anti-float device 148 includes a first piece 147 connected to the gearbox outer housing 105, a second piece 149 connected to the support housing 102, and a plurality of sprags 150 that allow relative movement between the pieces 147, 149 in only one direction. In other examples, the anti-float device 148 includes a ratchet (e.g., with a ratchet wheel attached to one of the gearbox outer housing 105 and the support housing 102 and one or more pawls attached to the other of the gearbox outer housing 105 and the support housing 102). In some implementations, the anti-float device 148 is used in combination with the damper 144. In other implementations, the anti-float device 148 is used without the damper 144.

Aspects of the Disclosure

1. A rotary actuator arrangement configured to mount to a support housing, the rotary actuator arrangement comprising:
   a rotary actuator including a gearbox operationally mounted to the support housing, the gearbox including an outer housing holding a plurality of gears that operationally couple an output shaft of the gearbox to a drive shaft of a power source; and
   a latch arrangement configured to transition between a locking state and an unlocking state, the latch arrangement maintaining the gearbox outer housing at a fixed position relative to the support housing when in the locking state, and the latch arrangement enabling the gearbox outer housing to rotate relative to the support housing when in the unlocking state.

2. The rotary actuator arrangement of aspect 1, wherein the output shaft of the gearbox is operationally coupled to a flight control component of an aircraft.

3. The rotary actuator arrangement of aspect 1 or aspect 2, wherein the latch arrangement includes a latch member configured to selectively engage and disengage a catch surface.

4. The rotary actuator arrangement of aspect 3, wherein the latch member is carried by the support housing and the catch surface is carried by the gearbox outer housing.

5. The rotary actuator arrangement of any of aspects 3-4, wherein the latch arrangement includes a solenoid that extends and retracts the latch member, the solenoid mechanically coupling the latch member with the gearbox outer housing and the support housing when extended, the solenoid decoupling the latch member from at least one of the gearbox outer housing and the support housing when retracted.

6. The rotary actuator arrangement of aspect 2, wherein the solenoid is mounted to the support housing.

7. The rotary actuator arrangement of any of aspects 1-6, wherein the gearbox outer housing is mounted to the support housing via a damper arrangement to dampen motion between the gearbox outer housing and the support housing when the latch arrangement is disposed in the unlocking state.

8. The rotary actuator arrangement of aspect 7, wherein the damper arrangement includes a friction damper.

9. The rotary actuator arrangement of aspect 7, wherein the damper arrangement includes a fluid damper.

10. The rotary actuator arrangement of any of aspects 1-9, wherein the gearbox outer housing is mounted to the support housing via an anti-float device to limit motion of the gearbox outer housing relative to the support housing to one direction when the latch arrangement is disposed in the unlocking state.

11. The rotary actuator arrangement of aspect 10, wherein the anti-float device includes a one-way clutch.

12. The rotary actuator arrangement of aspect 11, wherein the one-way clutch is a sprag clutch.

13. The rotary actuator arrangement of any of aspects 1-12, wherein the power source is an electric motor.

14. The rotary actuator management of aspect 13, wherein the electric motor is mounted to the gearbox outer housing to rotate with the gearbox outer housing.

15. The rotary actuator arrangement of any of aspects 1-14, further comprising:
  a controller arrangement operationally coupled to the latch arrangement to transition the latch arrangement between the unlocking state and the locking state, the controller arrangement including a latch controller interface configured to operate the latch arrangement and a jam sensor.

16. The rotary actuator arrangement of aspect 15, wherein the controller arrangement includes a processor and memory, the memory storing instructions for operating the jam sensor and instructions for detecting a jam based on signals obtained by the jam sensor.

17. A method of operating a rotary actuator of a flight control actuation arrangement, the method comprising:
  operating the rotary actuator in a non-jammed state including supplying power to an output shaft of a gearbox;
  detecting a jam in the gearbox; and
  releasing an outer housing of the gearbox from a support housing in response to detecting the jam, whereby the outer housing of the gearbox can rotate relative to the support housing.

18. The method of aspect 17, wherein releasing the outer housing of the gearbox from the support housing comprises enabling damped movement of the outer housing of the gearbox relative to the support housing.

19. The method of aspect 17 or aspect 18, wherein releasing the outer housing of the gearbox from the support housing comprises enabling movement of the outer housing of the gearbox relative to the support housing along only one rotational direction.

20. The method of any of aspects 17-19, wherein releasing the outer housing of the gearbox from the support housing comprises enabling movement of the output shaft of the gearbox relative to the support housing to a neutral position.

21. The method of any of aspects 17-20, wherein releasing the outer housing of the gearbox from the support housing comprises unlatching the outer housing of the gearbox from the support housing.

22. The method of aspect 21, wherein unlatching the outer housing of the gearbox from the support housing comprises retracting a solenoid.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A rotary actuator arrangement configured to mount to a support housing, the rotary actuator arrangement comprising:
  a rotary actuator including a gearbox operationally mounted to the support housing, the gearbox including an outer housing holding a plurality of gears that operationally couple an output shaft of the gearbox to a drive shaft of a power source; and
  a latch arrangement configured to transition between a locking state and an unlocking state, the latch arrangement maintaining the gearbox outer housing at a fixed position relative to the support housing when in the locking state, and the latch arrangement enabling the gearbox outer housing to rotate relative to the support housing when in the unlocking state;
  wherein the gearbox outer housing is mounted to the support housing via a damper arrangement to dampen motion between the gearbox outer housing and the support housing when the latch arrangement is disposed in the unlocking state.

2. The rotary actuator arrangement of claim 1, wherein the output shaft of the gearbox is operationally coupled to a flight control component of an aircraft.

3. The rotary actuator arrangement of claim 1, wherein the latch arrangement includes a latch member configured to selectively engage and disengage a catch surface.

4. The rotary actuator arrangement of claim 3, wherein the latch member is carried by the support housing and the catch surface is carried by the gearbox outer housing.

5. The rotary actuator arrangement of claim 4, wherein the latch arrangement includes a solenoid that extends and retracts the latch member, the solenoid mechanically coupling the latch member with the gearbox outer housing and the support housing when extended, the solenoid decoupling the latch member from at least one of the gearbox outer housing and the support housing when retracted.

6. The rotary actuator arrangement of claim 5, wherein the solenoid is mounted to the support housing.

7. The rotary actuator arrangement of claim 1, wherein the damper arrangement includes a friction damper.

8. The rotary actuator arrangement of claim 1, wherein the damper arrangement includes a fluid damper.

9. The rotary actuator arrangement of claim 8, wherein the gearbox outer housing is mounted to the support housing via an anti-float device to limit motion of the gearbox outer housing relative to the support housing to one direction when the latch arrangement is disposed in the unlocking state.

10. The rotary actuator arrangement of claim 9, wherein the anti-float device includes a one-way clutch.

11. The rotary actuator arrangement of claim 10, wherein the power source is an electric motor.

12. The rotary actuator arrangement of claim 11, wherein the electric motor is mounted to the gearbox outer housing to rotate with the gearbox outer housing.

13. The rotary actuator arrangement of claim 12, further comprising:
   a controller arrangement operationally coupled to the latch arrangement to transition the latch arrangement between the unlocking state and the locking state, the controller arrangement including a latch controller interface configured to operate the latch arrangement and a jam sensor, wherein the controller arrangement includes a processor and memory, the memory storing instructions for operating the jam sensor and instructions for detecting a jam based on signals obtained by the jam sensor.

14. A method of operating the rotary actuator arrangement of claim 1, the method comprising:
   operating the rotary actuator in a non-jammed state including supplying power to the output shaft of the gearbox;
   detecting a jam in the gearbox; and
   releasing the outer housing of the gearbox from the support housing in response to detecting the jam, whereby the outer housing of the gearbox can rotate relative to the support housing.

15. The method of claim 14, wherein releasing the outer housing of the gearbox from the support housing comprises enabling damped movement of the outer housing of the gearbox relative to the support housing.

16. The method of claim 15, wherein releasing the outer housing of the gearbox from the support housing comprises enabling movement of the outer housing of the gearbox relative to the support housing along only one rotational direction.

17. The method of any of claim 16, wherein releasing the outer housing of the gearbox from the support housing comprises enabling movement of the output shaft of the gearbox relative to the support housing to a neutral position.

18. The method of claim 17, wherein releasing the outer housing of the gearbox from the support housing comprises unlatching the outer housing of the gearbox from the support housing.

19. The method of claim 18, wherein unlatching the outer housing of the gearbox from the support housing comprises retracting a solenoid.

20. The rotary actuator arrangement of claim 1, wherein the latch arrangement is configured to extend and retract radially along the gearbox.

* * * * *